United States Patent [19]

Sonnentag et al.

[11] Patent Number: 4,630,532
[45] Date of Patent: Dec. 23, 1986

[54] COFFEEMAKER

[75] Inventors: Kurt J. Sonnentag, Naperville; Norman A. Steinkamp, La Grange Park, both of Ill.

[73] Assignee: John Zink Company, Tulsa, Okla.

[21] Appl. No.: 722,941

[22] Filed: Apr. 12, 1985

[51] Int. Cl.$^4$ .................... A47J 31/10; A47B 57/02
[52] U.S. Cl. ........................... 99/279; 99/306; 248/201; 248/317
[58] Field of Search .............. 99/279, 295, 300, 304, 99/306, 307, 313, 314, 281, 282, 283; 248/201, 317; 211/117

[56] References Cited

U.S. PATENT DOCUMENTS

| | | | |
|---|---|---|---|
| 3,232,212 | 2/1966 | Karlen | 99/283 |
| 3,511,166 | 5/1970 | Bixby | 99/295 |
| 4,008,656 | 2/1977 | Gruner | 99/298 |
| 4,540,146 | 9/1985 | Basile | 248/201 |

Primary Examiner—Robert W. Jenkins
Attorney, Agent, or Firm—Rose, Neil M.

[57] ABSTRACT

To minimize damage to the surrounding environment, a drip coffeemaker, adapted for use as either an under-the-cabinet unit or a counter-top unit and including a carafe, has a closed system during and following a brewing cycle with a venting arrangement being provided to vent heated vapor or steam back to a water reservoir of the system, the reservoir being fillable by a pull-out drawer. The carafe is a glass vessel having a plastic collar mounted thereon in which is supported a coffee basket. A cover for the carafe has an annular groove provided in its top surface with a series of ports formed in the bottom of the groove in a spreader configuration. The coffeemaker also includes a cabinet-type housing having a carafe-receiving cavity with a ported shower plate floatingly mounted in the top of the cavity for sealing engagement with the top of the carafe cover when the carafe is inserted into the cavity. The venting arrangement is provided, in part, in the shower plate. Bracket-latching mechanisms are provided inside the coffeemaker cabinet for adjustment mounting the cabinet on a pair of brackets which depend from a kitchen cabinet.

38 Claims, 18 Drawing Figures

COFFEEMAKER

BACKGROUND OF THE INVENTION

With the growing trend of more and more useful, but space-consuming kitchen appliances, counter space in the average kitchen is at a premium. One solution for this problem is the development of appliances that may be hung on a wall or suspended from the underside of kitchen cabinets, thus freeing up valuable kitchen counter space.

SUMMARY OF THE INVENTION

The instant invention is concerned with a drip coffeemaker which is adapted for use either on a countertop or table or suspended beneath a kitchen cabinet. Particuarly as a result of the under-the-cabinet suspension feature of the drip coffeemaker of the instant invention, several different problems require suitable solutions. First, as water reservoirs for drip coffeemakers are normally filled from the top, a coffeemaker, such as the one disclosed herein, in which the reservoir is not readily removable from a coffeemaker cabinet, presents one problem. This problem is solved by providing a "no-splash" pull-out filling drawer which drains or discharges into the reservoir positioned therebelow. Another serious problem with an under-the-cabinet appliance which generates heated vapors or steam, such as a coffeemaker, is the detrimental effect of such on the surrounding environment including the supporting kitchen cabinet, particularly the underside thereof. Applicants have solved this problem by providing a closed system wherein substantially all the heated vapor or steam developed in the coffee carafe or in the brewing system is vented back to the reservoir. Further, any condensate developed in the carafe on or around the coffee basket drains back into the carafe whereby to maintain the desired coffee strength. By providing suitable plugs for the slots provided in the top of the coffeemaker cabinet for receiving the mounting brackets depending from a kitchen cabinet, this unit may be used as either an under-the-cabinet coffeemaker or as a counter-top coffeemaker.

It is an object of the present invention to provide a new and improved drip coffeemaker that may be used either while suspended beneath a kitchen cabinet or while supported on a counter-top or table.

Another object of the present invention is to provide a new and improved drip coffeemaker wherein the coffee carafe is sealed in a carafe-receiving cavity in the coffeemaker cabinet during and after a coffee brewing operation whereby to prevent the escape of heated vapors, venting means being provided to vent same to the water reservoir in the coffeemaker cabinet.

A still further object of the present invention is to provide a new and improved coffeemaker which is mountable beneath a kitchen cabinet in any one of a series of vertically spaced positions below the kitchen cabinet by means of a pair of brackets secured to, and depending from, the kitchen cabinet, the coffeemaker cabinet being easily removed from or vertically adjusted relative to the brackets.

Yet another object of the present invention is to provide a new and improved coffeemaker wherein a pull-out filling drawer is provided for filling a reservoir which isn't normally removable from the coffeemaker cabinet, and wherein the coffee carafe is characterized by a glass vessel having a plastic collar mounted thereon with a pouring spout and an annular shoulder configuration for supporting a coffee basket therein, and a cover for the collar having a series of ports formed in its upper surface in a spreader configuration for distributing heated water to coffee in the coffee basket, the cover being adapted for sealing engagement with a floating shower plate provided in the coffeemaker cabinet when the carafe is inserted into the cavity provided therefor in the coffeemaker cabinet.

Further objects and advantages of the present invention will become apparent as the following description proceeds, and the features of novelty which characterize the invention will be pointed out with particularity in the claims annexed to and forming a part of this specification.

DESCRIPTION OF THE PREFERRED EMBODIMENT

Figure 1:
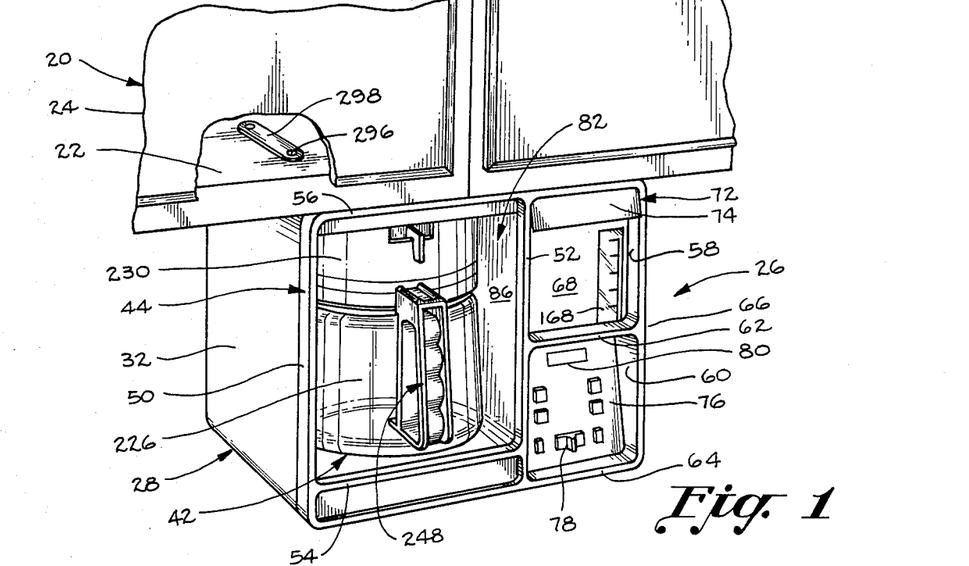
FIG. 1 is a perspective view of a drip coffeemaker embodying our invention and mounted beneath a kitchen cabinet.
Figure 4:
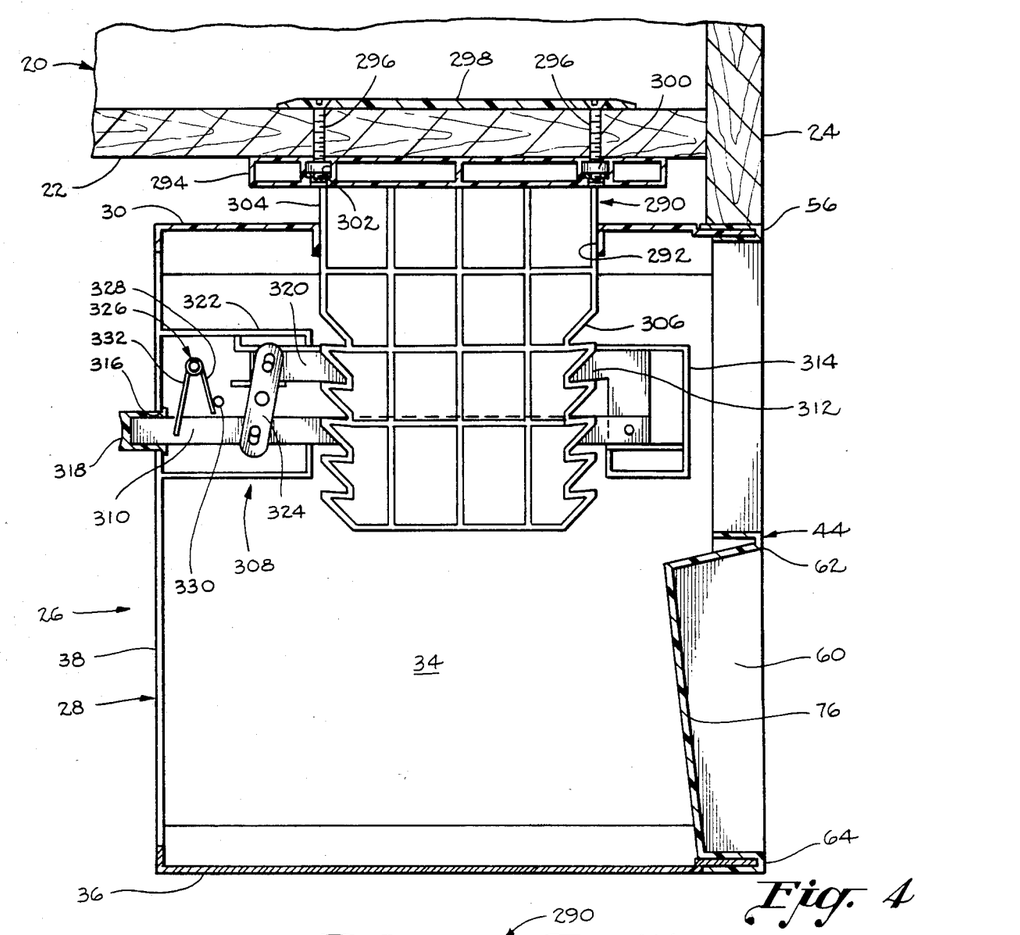
FIG. 4 is a vertical section taken generally along the line 4—4 of FIG. 3 showing the bracket-engaging mechanism in its latching condition.

With reference to the drawings, there is shown in FIG. 1 a typical kitchen cabinet 20 having a bottom shelf 22 and a door 24 which extends downwardly past the bottom shelf 22, as is also shown in FIG. 4. Suspended beneath the kitchen cabinet 20 in a manner which will be fully described hereinafter is a drip coffeemaker 26 which is characterized by a housing or cabinet 28 having a top wall 30, side walls 32 and 34, a bottom wall or plate 36, and a back wall or plate 38. A portion of the front of said coffeemaker cabinet 20 is open providing access to a carafe-receiving cavity 40 which is adapted to receive therein a coffee carafe 42.

Figure 3:
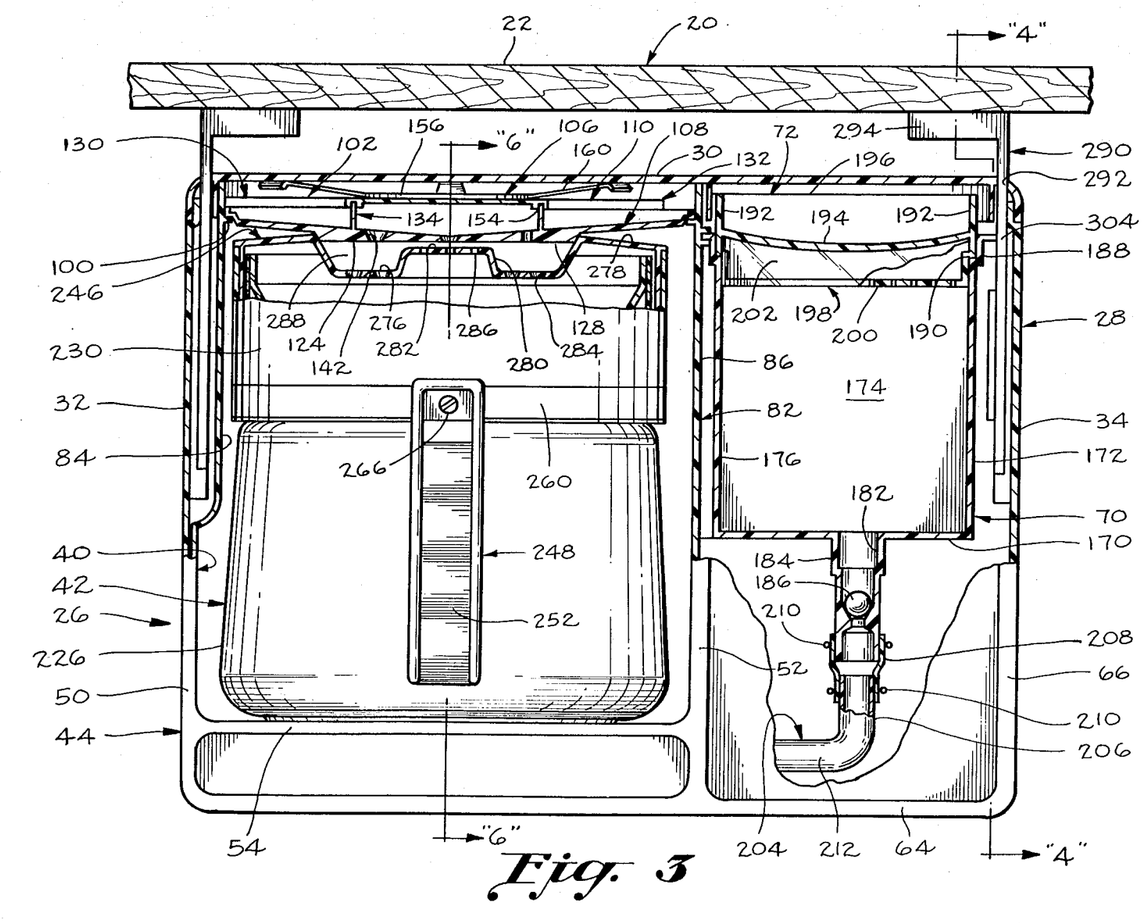
FIG. 3 is a front elevational view of the coffeemaker mounted beneath a kitchen cabinet partially in vertical section, the carafe being shown in its carafe-receiving cavity in the coffeemaker cabinet.
Figure 5:
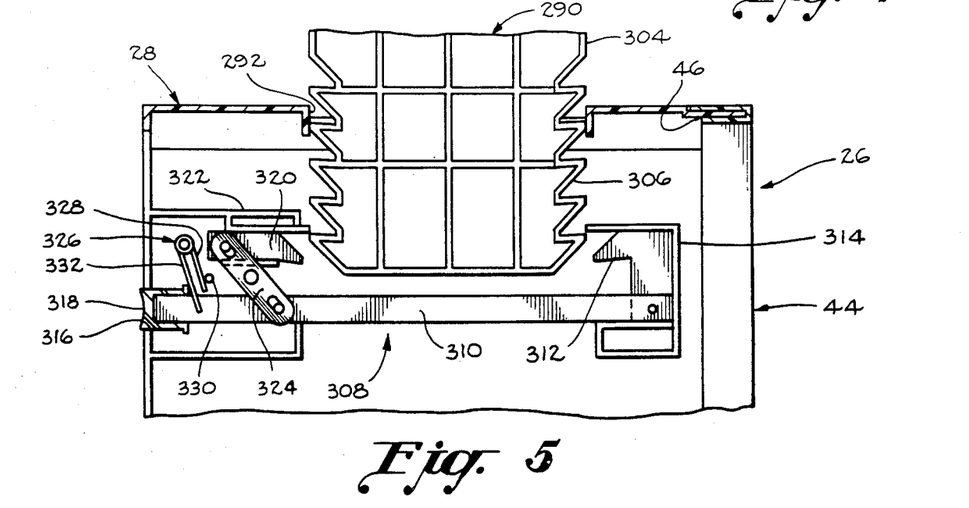
FIG. 5 is a partial vertical sectional view similar to FIG. 4 but showing the bracket-engaging mechanism in its release condition.
Figure 8:
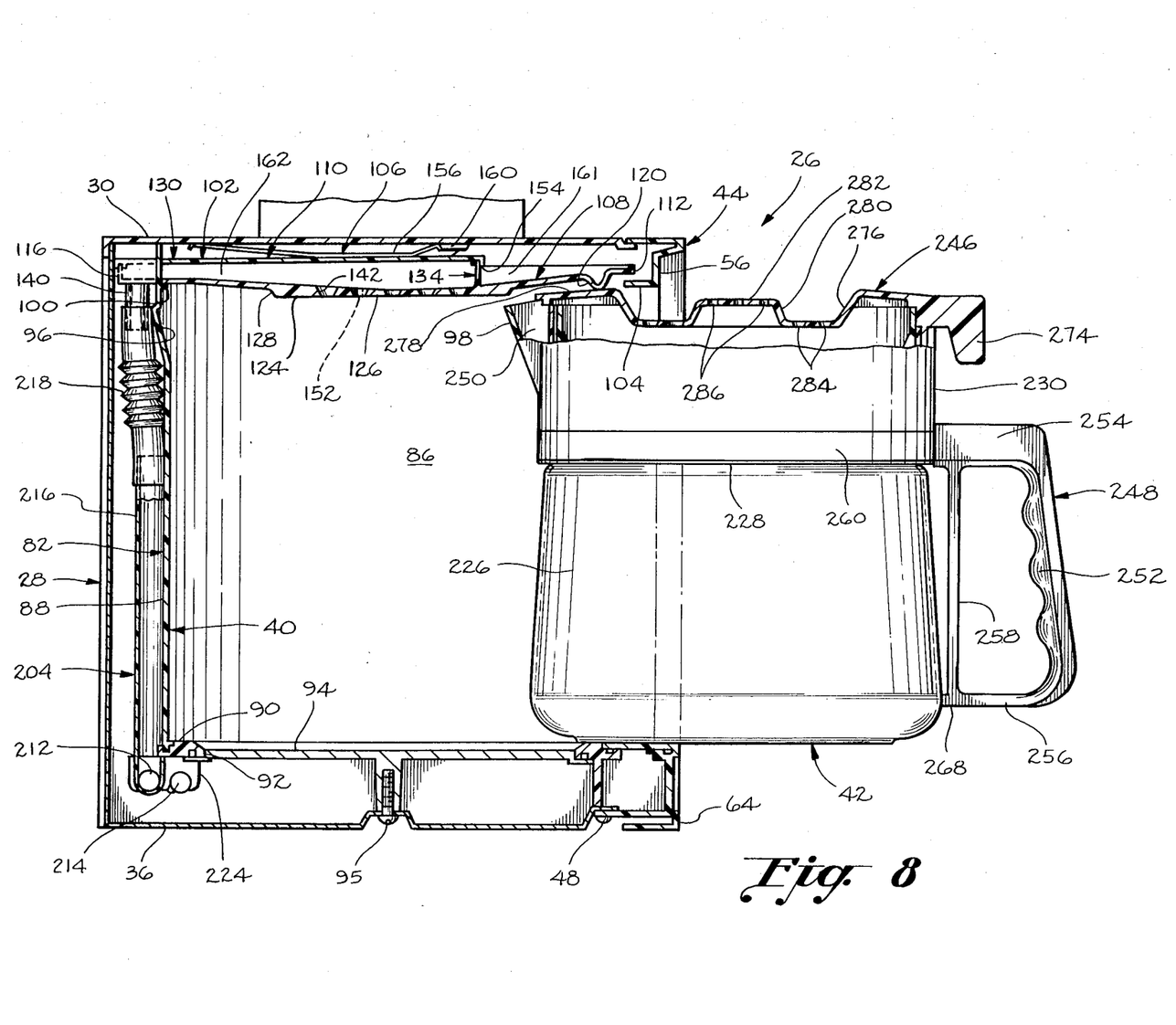
FIG. 8 is a vertical sectional view similar to FIG. 6 showing the carafe as it is being inserted into the carafe-receiving cavity in the coffeemaker cabinet.

The open front of the coffeemaker cabinet 20 is provided with a frame member 44 which is fitted over the front edges of the top and side walls 30, 32, 34 in a known manner (as shown, for instance, at 46 in FIG. 5) and secured to the front edge of the bottom wall or plate 36 by suitable fastening means (as shown at 48 in FIG. 8). The carafe-receiving cavity 40 is defined by vertical frame portions 50 and 52, horizontal frame portion 54 and a part of horizontal frame portion 56 of the frame member 44. Two other vertically spaced recesses 58 and 60 are defined alongside the carafe-receiving cavity 40 by the rest of horizontal frame portion 56, horizontal frame portions 62 and 64, and vertical frame portions 52 and 66 of the frame member 44. Visible in the upper open recess 58 is a front wall 68 of a water reservoir 70 which is non-removably supported in the cabinet 28 in a suitable manner. A pull-out filling drawer 72 is slidably supported on the upper edge of the reservoir 70 and has a drawer-pull portion 74 provided on its outer end for easy gripping. The reservoir 70 and filling drawer 72 will be discussed in greater detail hereinafter.

The lower recess 60, as best illustrated in FIG. 4, has an upwardly and rearwardly inclined back wall 76 adapted to have mounted thereon an off/on switch 78 and other suitable controls, indicator lights, and/or a timer such as either an analog clock timer or a digital timer, as is illustrated in FIG. 1 at 80.

Figure 2:
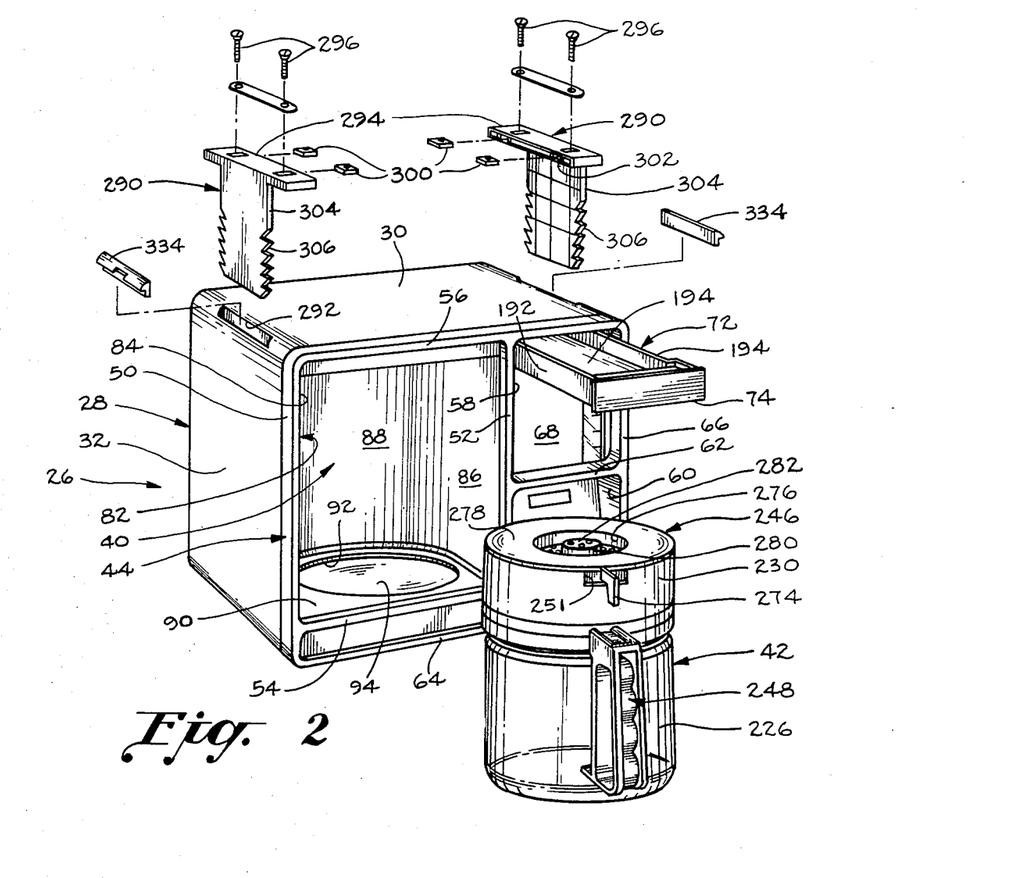
FIG. 2 is a partially exploded perspective view showing the means for mounting the coffeemaker cabinet beneath a kitchen cabinet and showing the plugs provided for counter-top use of the coffeemaker, the filling drawer in its filling position, and the coffee carafe removed from the cavity provided in the coffeemaker cabinet.
Figure 6:
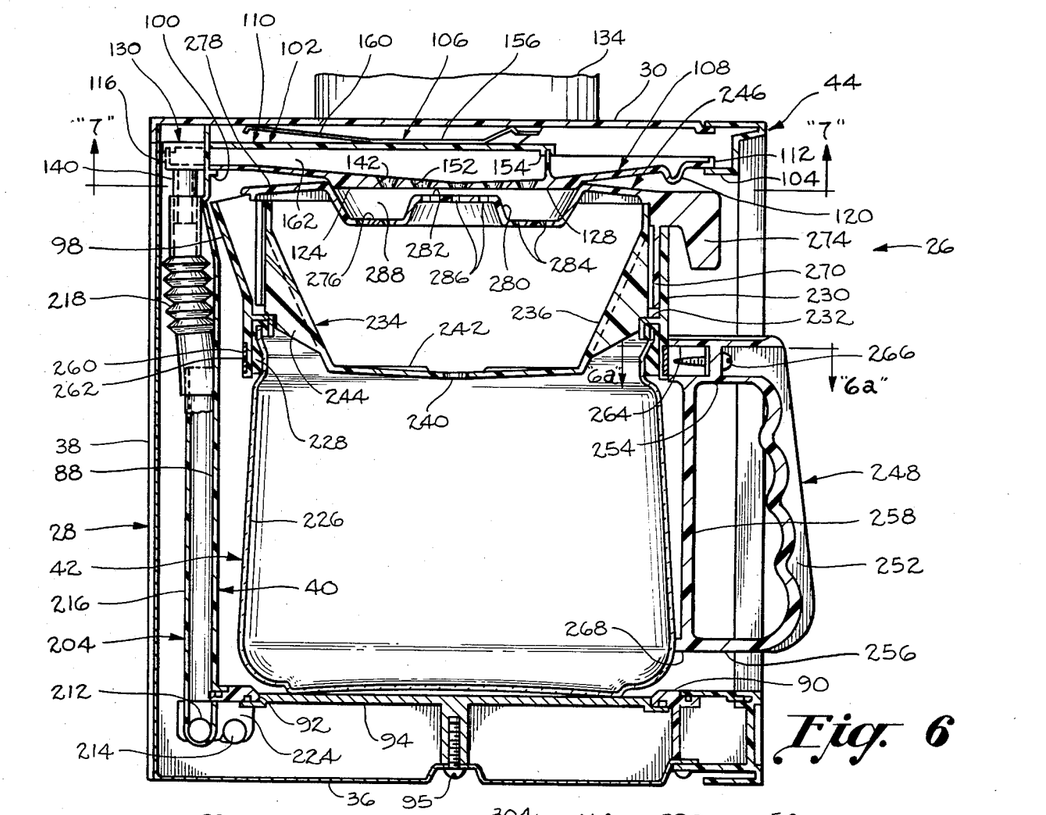
FIG. 6 is a vertical sectional taken generally along line 6—6 of FIG. 3.
Figures 6A, 17:
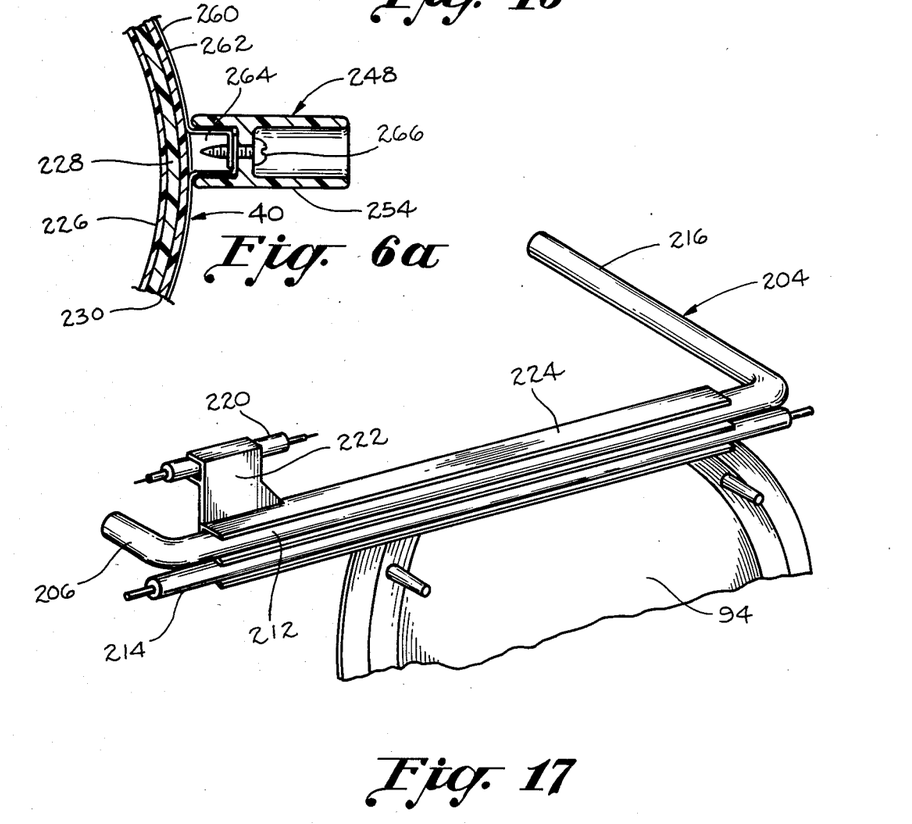
FIG. 6a is a partial horizontal sectional view taken generally along the line 6a—6a of FIG. 6.
FIG. 17 is a partial bottom perspective view showing a part of the warming plate, part of the conduit means between the reservoir and the shower plate, the linear heater, and the holder for the conduit means, the heater, and a fuse in the heater circuit.
Figure 7:
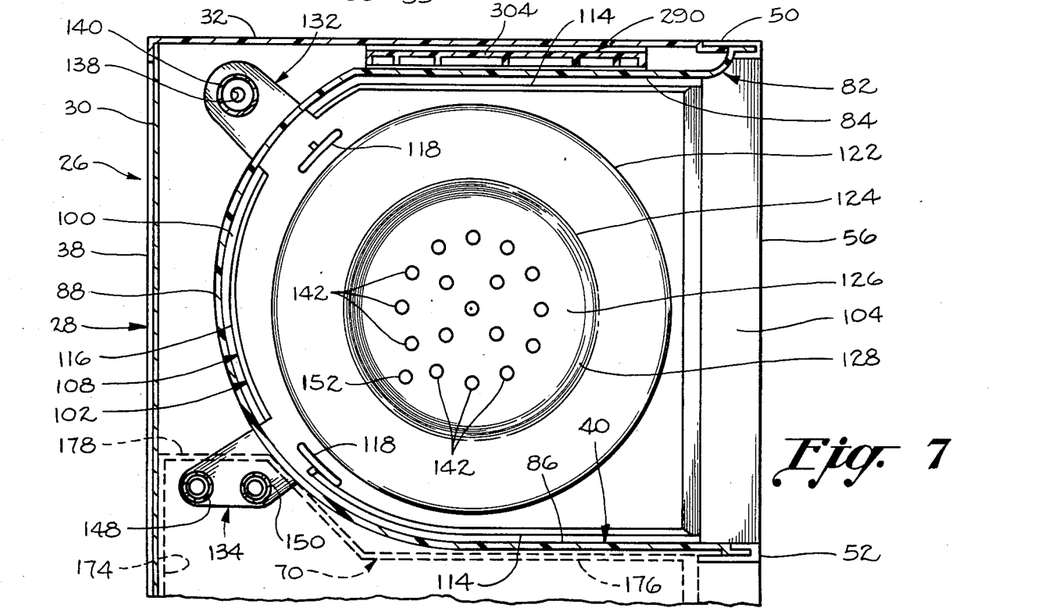
FIG. 7 is a partial horizontal sectional view taken generally along the line 7—7 of FIG. 6.

As best illustrated in FIGS. 2, 7 and 8, the carafe-receiving cavity 40 is defined by an inner shell structure 82 having parallel vertical side walls 84 and 86, an integral curved rear wall 88, a bottom wall 90 having a large circular opening 92 provided therein, and an open front and an open top. A warming plate 94 (FIGS. 6, 8 and 17) is provided in the opening 92 provided in the bottom wall 90 of the cavity shell structure 82, the warming plate 94 being supported in a known manner by fastener means 95 on the bottom plate 36 of the coffeemaker cabinet 28 with its upper surface spaced slightly below the upper surface of the bottom wall 90 of the cavity shell structure 82. As shown in FIG. 8, the upper back portion of the curved rear wall 88 of the shell structure 82 is provided with a shallow annular recess 96 adapted to accommodate a pouring spout 98 of the carafe 42.

The upper portion of the side wall 84 of the shell structure 82 adjacent the left side wall 32 of the cabinet 28 is spaced inwardly, as is best illustrated in FIGS. 3 and 7, whereby to accommodate one of two mounting brackets 290, as will be described in greater detail hereinafter.

Figure 11:
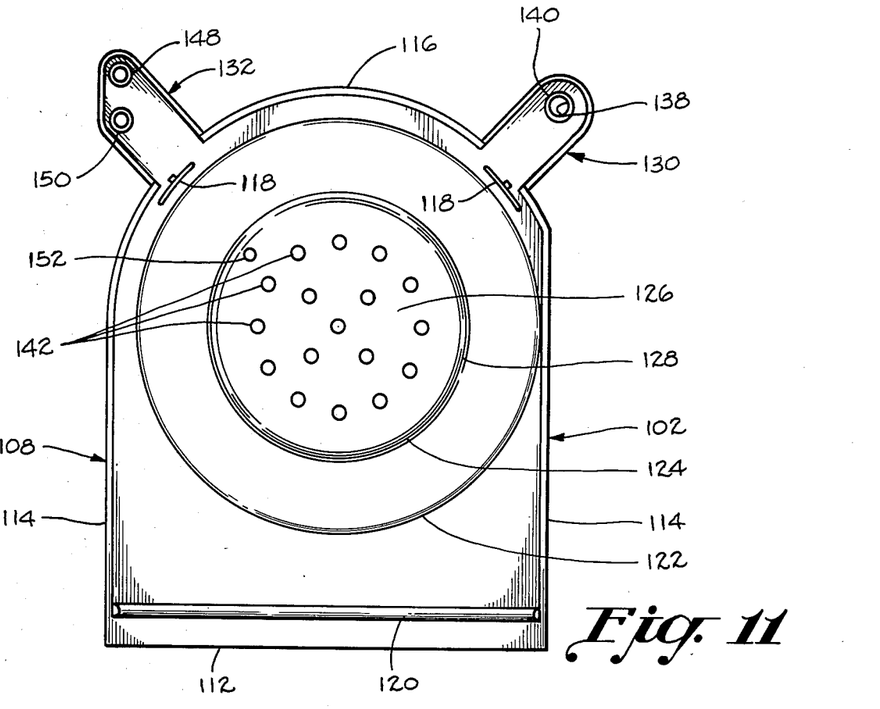
FIG. 11 is a bottom plan view of the shower plate.
Figure 12:
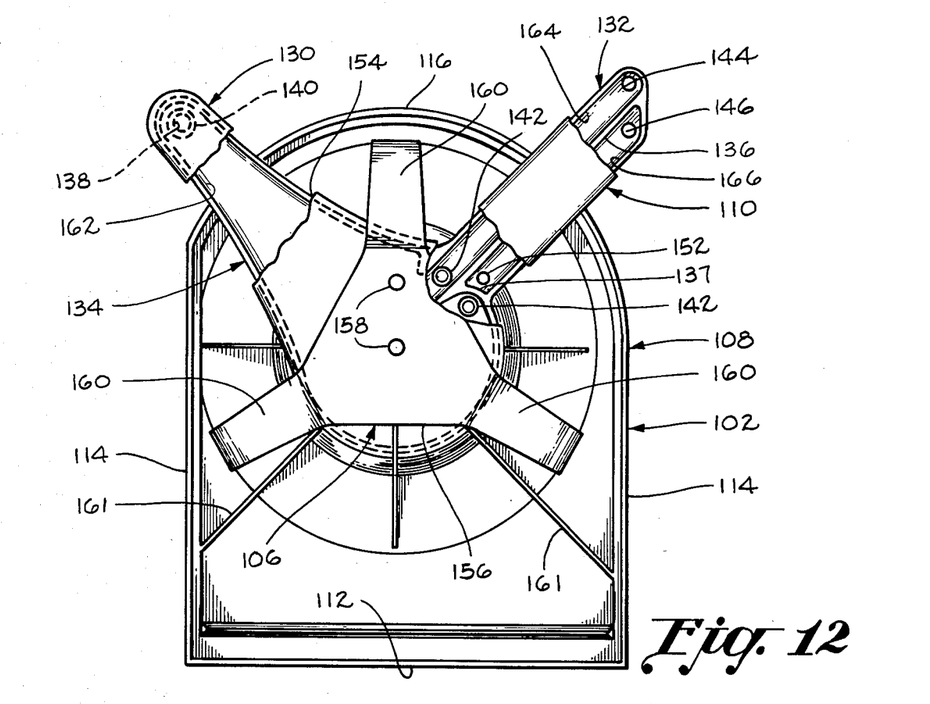
FIG. 12 is a top plan view of the shower plate with the spring mounted thereon and with the shower plate cover partially broken away.

The upper portions of the shell structure rear and side walls 88, 86 and 84 are provided with a continuous inwardly directed flange 100 (FIG. 3) which is adapted to provide partial support for a shower plate 102 which is best shown in FIGS. 11 and 12. The upper frame portion 56 of the frame structure 44 is provided, as best illustrated in FIG. 6, with a rearwardly directed flange 104 which also serves to support the shower plate 102. When supported on the flanges 100 and 104, the shower plate 102 is spaced below the top wall 30 of the cabinet 28. As shown in FIGS. 3, 6, 8, 12 and 13, a three-legged leaf spring 106 is provided between the underside of the top wall 30 of the cabinet 28 and the shower plate 102 whereby to bias the shower plate 102 downwardly toward the flanges 100 and 104. With this arrangement, the shower plate 102 may be described as being floatingly mounted in the upper portion of the carafe-receiving cavity 40.

As best illustrated in FIGS. 3, 6, 7, 8, 11, 12 and 13, the shower plate 102 has a rather unusual configuration and is characterized by a lower plate portion 108 and by an angular cover portion 110. As illustrated in the bottom plan view of FIG. 11, the lower plate portion 108 has a straight front edge 112 supportable on the frame structure flange 104 and parallel side edges 114 and a curved rear edge 116 supportable on the shell structure flange 100. A pair of curved or arcuate stop or positioning members 118 depend from the underside of the plate portion 108 for a purpose to be described and a depending rounded rib 120 is provided parallel to and spaced rearwardly of the front edge 112 of the plate portion 108, also for a reason to be described hereinafter. A circular portion 122 of the underside of the plate portion 108 is tapered downwardly and inwardly toward a circular depending formation 124 having a horizontal planer surface 126 and a gently curved and inclined side edge 128, as is best illustrated in FIGS. 8 and 11.

Figure 13:
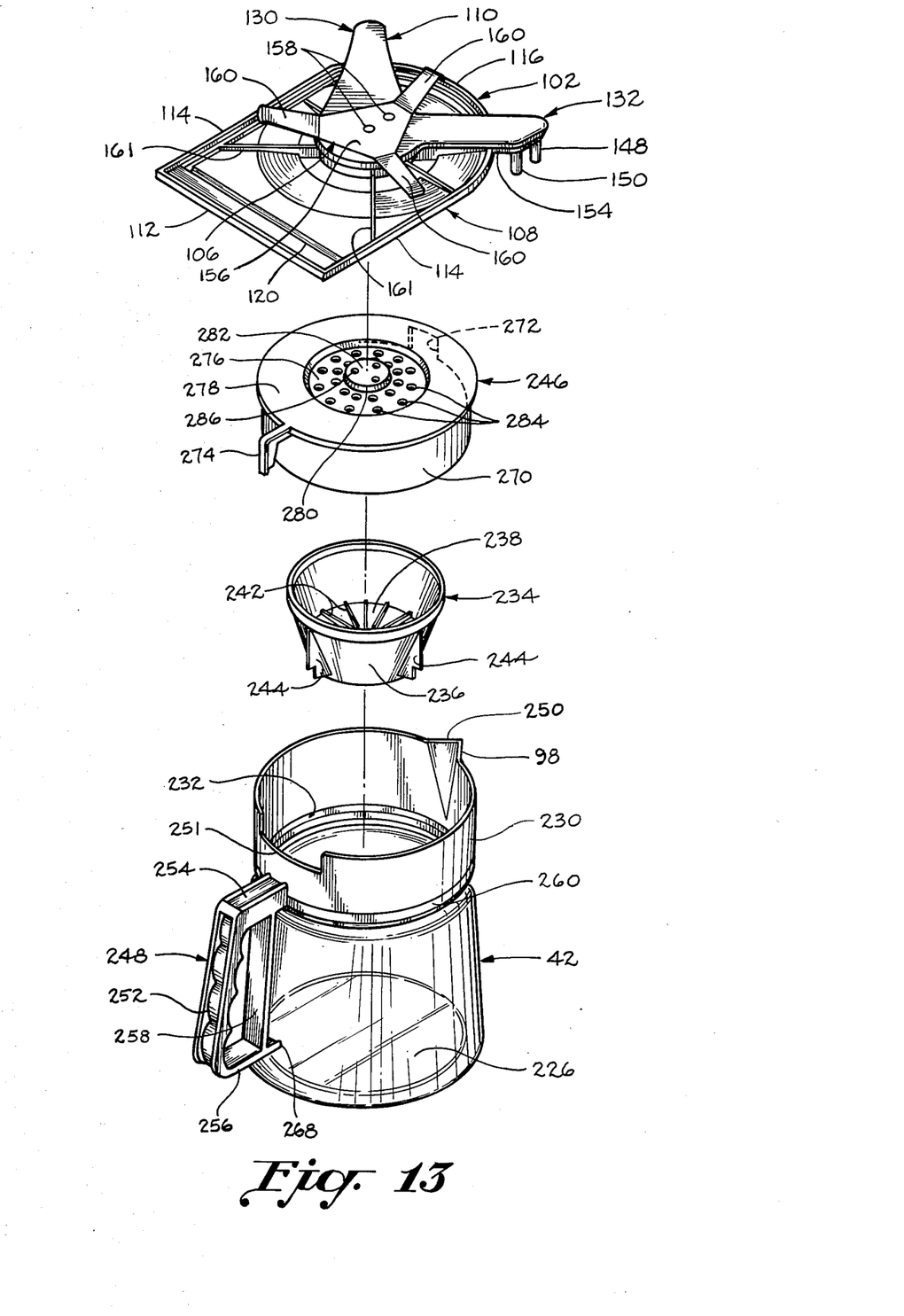
FIG. 13 is an exploded perspective view showing the separable parts of the coffee carafe and the shower plate.
Figure 14:
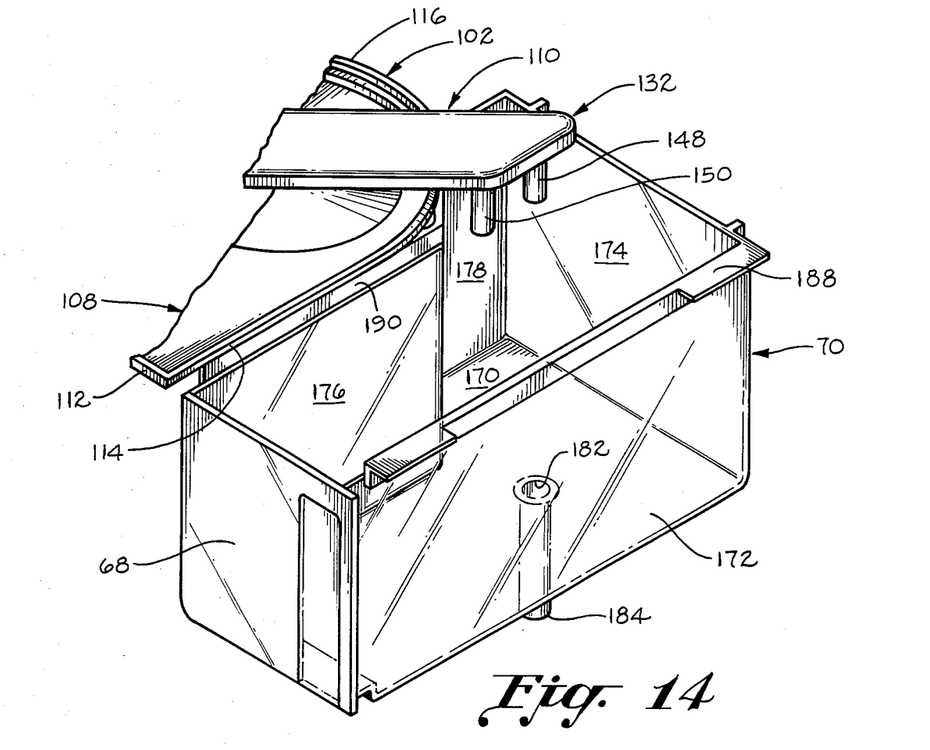
FIG. 14 is a partial perspective view showing the reservoir and the venting from the shower plate to the reservoir.

Again, with reference to FIGS. 3, 8, 12 and 13, the upper surface of the circular portion 122 of the plate portion 108 is tapered downwardly and inwardly toward the center thereof, whereby defining a flat conelike configuration. As shown in FIG. 11, the plate portion 108 has a pair of radial projections 130 and 132 which extend outwardly or rearwardly of the curved rear edge 116 thereof, each at an angle of approximately 45° on opposite sides of a vertical plane extending through the center of the circular depending formation 124 and at right angles to the back wall 38 of the cabinet 28. Radial projection 130 serves as an inlet and radial projection 132 serves as venting means. As best shown in FIGS. 3 and 12, an integral upstanding continous rib formation 134 outlines both the inlet radial projection 130 and the venting radial projection 132 and then forms a partial circular arc which, as shown in FIG. 3, is spaced somewhat inwardly of the circular side edge 128 of the circular depending formation 124. A further integral upstanding rib formation 136 extends down the longitudinal center of said venting projection 132 and across the inner end thereof, as at 137, for a reason to be discussed hereinafter. An inlet port 138 is provided in the end of the inlet projection 130 and has a depending integral nipple 140 (FIG. 8). A series of discharge ports 142 is formed in the center of the circular portion 122 of the plate portion 108 inwardly of the rib formation 134. A pair of primary and secondary vent ports 144 and 146 are provided in the end of the venting projecting 132, one on either side of the rib formation 136, and each is provided with an integral depending nipple 148 and 150, respectively, (FIGS. 13 and 14). A single vent port 152 is provided in the plate portion 108 on the side of the inner end portion 137 of the rib formation 136 toward the secondary vent port 146.

The angular cover 110 of the shower plate 102 has the same general shape as the upstanding rib formation 134 and has spaced apart depending ribs extending about the periphery thereof for receiving and gripping in a press fit the upper edge of the upstanding rib formation 134, as best illustrated at 154 in FIGS. 3, 6, 8, 12 and 13. The leaf spring 106 has a main body portion 156 which is secured to the top of the shower plate 110 by suitable known means, as at 158, and three upwardly bent arms 160. Radially extending integral strengthing ribs 161 (FIGS. 12 and 13) may also be provided on the shower plate 102.

The shower plate 102 described herein is thus characterized by an inlet passage 162 (FIG. 12) for heated water from said inlet port 138 to said discharge ports 142, defined generally by said rib formations 134 and 137, with the inlet projection 130 extending over, or through, a slot in the upper edge of the curved rear wall 88 of the cavity shell structure 82 whereby the inlet nipple 140 is disposed in the left/rear corner of the coffeemaker cabinet 28 and by venting means in said vent projection 132 which also extends over, or through, a slot in the upper edge of the curved rear wall 88 of the cavity shell structure 82 whereby the vent nipples 148 and 150 are disposed rearwardly of the curved rear wall 88 and generally in alignment with the right side wall 86 of the cavity shell structure 82. The venting means is more specifically characterized by a first or primary venting passage 164 from said discharge/vent ports 142 to said primary vent port 144 and by a second or secondary venting passage 166 from said single vent port 152 to said secondary vent port 146. Operation of the venting means will be discussed further hereinafter.

Figure 9:
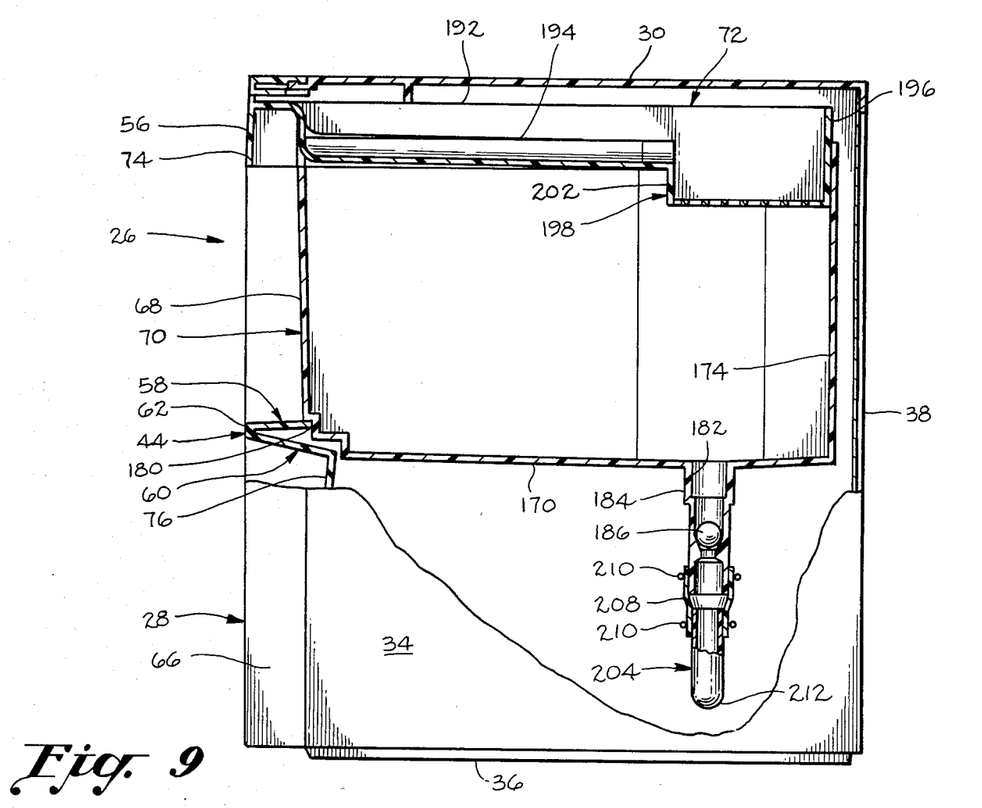
FIG. 9 is a right end elevational view of the coffeemaker cabinet partially in vertical section through the pull-out drawer and reservoir.
Figure 10:
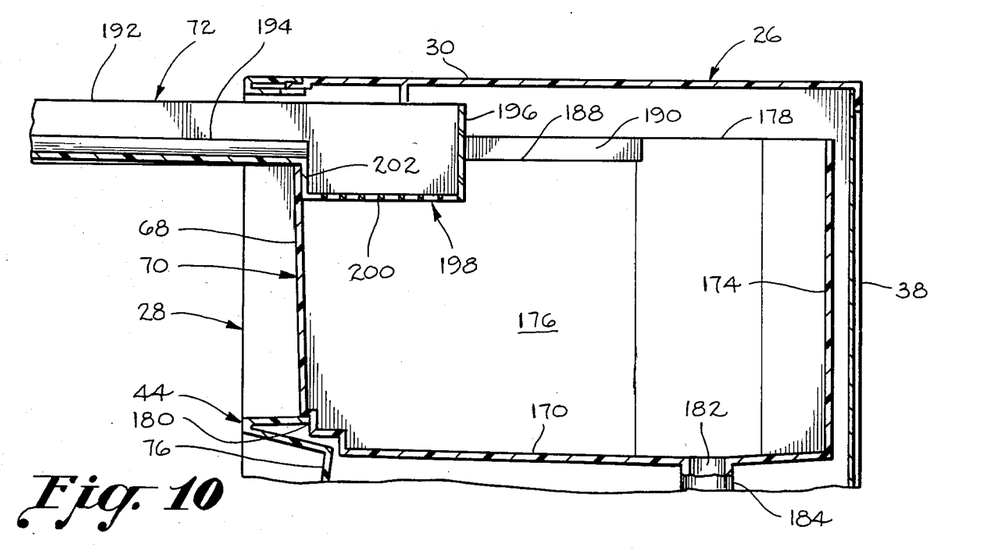
FIG. 10 is a partial vertical sectional view similar to FIG. 9 showing the drawer in its filling position.

The reservoir 70, as best illustrated in FIGS. 3, 7, 9, 10 and 14, is formed of a clear plastic material and is supported in the coffeemaker cabinet 28 in any known suitable manner above the bottom wall or plate 36 and with its front wall 68, upon which cup measurement indicia 168 (FIG. 1) are provided, visible in the upper recess 58 in the frame number 44. The reservoir 70 is generally rectangular with a bottom wall 170, a right side wall 172, a back wall 174, and a left side wall 176, which is provided with an angular offset portion 178 which extends behind the curved rear wall 88 of the carafe-cavity shell structure 82 whereby the two vent nipples 148 and 150 on the venting projection 132 overly the offset reservoir portion 178 for reasons which will be discussed hereinafter. As shown in FIGS. 9 and 10, the lower front edge of the reservoir 70 is supported on a portion of the frame member 44 defining the bottom of the reservoir recess 58, as at 180. A drain opening 182 associated with an integral depending stepped nipple/valve housing 184 is provided in the bottom wall 170 near the rear of the reservoir 70, the bottom wall 170 being slightly inclined toward the drain opening 182. A ball valve 186 in the nipple/valve housing 184 serves as a known-type ball check valve. Outwardly directed flanges 188 on the upper edges of the reservoir side walls 172 and 176 provide additional means for supporting the reservoir 70 in the coffeemaker cabinet 28 and also define guide means for slidably supporting and guiding the filling drawer 72, as at 190 in FIG. 3.

The filling drawer 72, which is open-topped and also formed of clear plastic, has two side walls 192 which extend rearwardly from the drawer-pull portion 74 and which are slidably supported on the reservoir 70 at 190, a "no-splash" bottom wall 194 which is not only slightly inclined downwardly toward the rear of the drawer 72 but which also has an arcuate configuration in a vertical plane transverse to the direction of movement of the drawer 72, and by a rear wall 196. The filling drawer 72 is provided at its inner end with a depressed discharge area 198 which extends below the bottom wall 194 and has a large-mesh screen-like bottom configuration 200. The discharge area 198 has a front wall 202 which depends from the rear edge of the bottom wall 194 and is integrally formed with downwardly extensions of the side walls 192 and the rear wall 196. As best illustrated in FIG. 10, outward movement of the filling drawer 72 is limited by engagement of its front wall 202 with the front wall 68 of the reservoir 70. It is further noted that in all positions of the filling drawer 70, the discharge area 198 is disposed over the reservoir 70.

Conduit means 204 provided between the water reservoir 70 and the shower plate 102 includes a first short vertical section 206 which is connected to the lower end of the nipple/valve housing 184 by a short section of plastic hose 208 and wire clamps 210 in a known manner (FIGS. 3 and 9), a horizontal section 212 which extends alongside a heater 214 associated with the warming plate 94 (FIGS. 6, 8 and 17), and a second vertical section 216 which is connected to the inlet nipple 140 by a plastic accordion-pleated hose section 218 (FIGS. 6 and 8) which permits up and down floating movement of the shower plate 102 without damage to the connection between the conduit section 216 and the inlet nipple 140. The horizontal conduit section 212 and the heater 214 form what may be referred to as a thermal pumping arrangement which, when the heater 214 is energized, delivers heated water to the shower plate 102 in a manner well known in the art.

Although the heater circuit does not constitute part of the invention and is neither shown nor claimed, it does include a fuse which is disposed in the section of a lead 220 which forms part of the heater circuit and which is held in a fuse-holder portion 222 of a holder 224 for the heater 214 and the horizontal conduit section 212. Although the heater 214 is shown as being a linear heater, it is to be understood that the warming plate 94 could be provided on its underside with a more common circular or loop shaped heater. In this instance, the horizontal conduit section would most likely also have its configuration changed to conform somewhat to that of the heater.

The carafe 42, as shown on FIGS. 1, 2, 6, 6a, 8, 13, 15 and 16, includes an open-topped glass vessel 226 having a plastic sleeve member 228 with an inverted U-shaped cross section which is fitted over the upper edge of the glass vessel 226 (FIG. 6); a plastic sleeve-like collar member 230 fitted over the plastic sleeve member 228 and having an integral inwardly and downwardly extending shoulder 232 located intermediate its upper and lower edges and adapted to be fitted over the portion of the plastic sleeve member 228 which is fitted over the upper edge of the glass vessel 226 for mounting the collar member 230 on the glass vessel 226; an open topped coffee basket 234 having a conical side wall 236, a flat bottom 238 with a center discharge opening 240, a series of radially extending ribs 242 for supporting a known-type paper filter (not shown) above the flat bottom 238, and a series of circumferentially spaced vertically extending stepped ribs 244 projecting radially from the conical side wall 236 for supporting the coffee basket 234 on the shoulder 232 of the collar member 230 (FIG. 6); and a carafe cover 246 rotatably supported on the upper edge of the collar member 230. The carafe 42 has a handle 248 and a pouring spout 250 is provided on the collar member 230 generally diametrically opposite from a control slot 251 which is provided in the upper edge of the collar member 230. The handle 248 which is formed of plastic has a generally vertically disposed gripping portion 252, upper and lower horizontal portions 254 and 256, and a generally vertically disposed finger-guard 258 which is spaced inwardly of the gripping portion 252 and outwardly away from the glass vessel 226. The handle 248 is mounted on the collar member 230 in a known manner by a thin metal strap or band 260 which is disposed in a shallow annular groove 262 provided on the outer surface of the collar member 230 adjacent the lower edge thereof and which has bent ends which are received in a recess 264 provided in the upper horizontal portion 254 of the handle 248, a screw-type fastener 266 which extends through overlapped ends of the strap 260 being provided to tighten the strap 260 on the collar member 230, as best illustrated in FIGS. 6 and 6a. An inner end 268 of the lower horizontal portion 256 of the handle 248 directly engages the glass vessel 226 to further stablize the handle 248.

Figure 15:
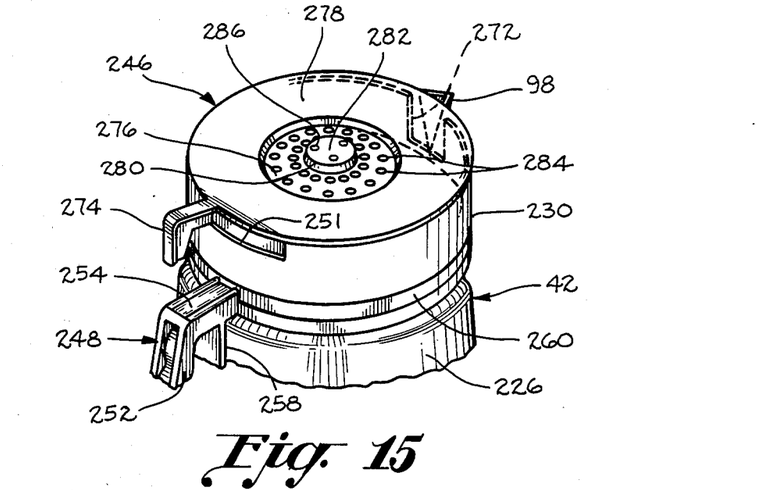
FIG. 15 is a perspective view of the upper portion of the carafe with the cover rotated to a first position in which the pouring spout is open for pouring coffee.
Figure 16:
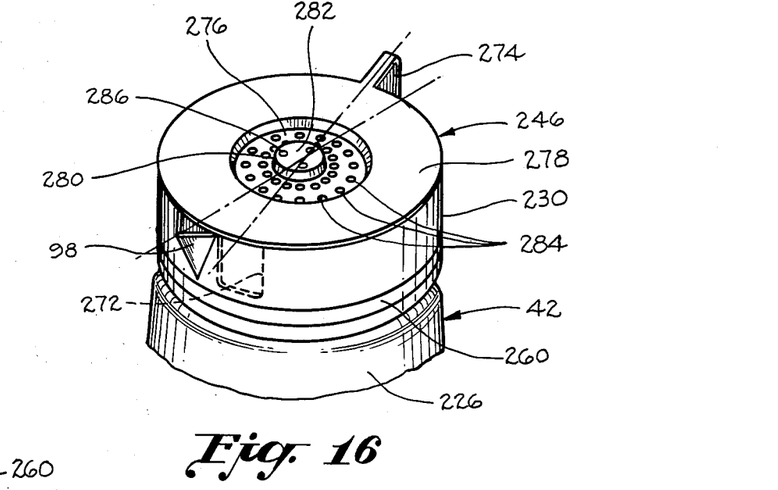
FIG. 16 is a further perspective view of the upper portion of the carafe taken from another angle illustrating a second position of the cover in which the pouring spout is blocked or sealed off.

The carafe cover 246 has a dending skirt portion 270 which is telescopically receivable in the collar member 230 and which normally serves to close off the pouring spout 250 to prevent the escape of heated vapor or steam therefrom. The skirt portion 270 has an opening 272 formed therein which is rotatable into alignment with the pouring spout 250 to permit the pouring of coffee from the carafe 42. To facilitate rotation of the cover 246, a radially extending control handle 274 provided on the skirt portion 270 is receivable in the control slot 251 for rotation of the cover 246 between two limit positions, a "pour" position in which the opening 272 is aligned with the pouring spout 250 and a "brew/-seal" position in which the pouring spout 250 is closed off. The two limit positions are best illustrated in FIGS. 15 and 16.

The cover 246 has an annular groove 276 formed in its upper surface 278, thus defining a center island 280, an upper surface 282 of which is spaced slightly below the main portion of the upper surface 278 of the cover 246 for a reason which will be explained hereinafter. Also for a reason that will be self evident hereinafter, the upper surface 278 of the cover 246 is gently inclined upwardly from its outer periphery to the outer edge of the grooves 276. A large number of ports 284 are formed in the bottom of the groove 276 in a spreader configuration whereby to direct heated water from the groove 276 onto coffee disposed in the coffee basket 234 positioned therebelow. As will be explained hereinafter, the ports 284 also serve as primary vent ports. A lesser number of secondary vent ports 286 are provided in the upper surface 282 of the center island 280.

When the carafe 42, with the proper amount of coffee in the coffee basket 234, is inserted into the carafe-receiving cavity 40 prior to the initiation of a coffee-brewing cycle, the inclined upper surface 278 of the carafe cover 246, as illustrated in FIG. 8, first engages the rounded front rib 120 of the floatingly mounted shower plate 102 to raise the shower plate 102 until the carafe 42 is fully inserted into the cavity 40 whereupon, as illustrated in FIG. 6, the circular depending formation 124 on the underside of the shower plate 102 is automatically sealingly seated in the outer periphery of the carafe cover groove 276 whereby to define a sealed space 288 between the shower plate 102 and the carafe cover 246 and thereby provide a closed brewing system which effectively prevents escape of the heated vapor or steam during and following a brewing cycle, assuming, of course, that the pouring spout 250 is closed off as previously described herein. Next, the proper volume of water is introduced into the reservoir 70 by means of the "no splash" filling drawer 72. The coffeemaker 26 is then turned on whereupon water from the reservoir 70 is heated by the thermal heating arrangement and pumped through the conduit means 204 to the shower plate 102 where it passes through the inlet passage 162 and through the discharge/vent ports 142 into the carafe cover groove 276 from which it passes through the ports 284 into the coffee in the coffee basket 234. The brewed coffee passes into the carafe 42 through the opening 240 in the bottom wall 238 of the coffee basket 234.

During and after the brewing process, any back pressure and/or heated vapor or steam developed in the carafe 42 or in the coffeemaker system is vented back to the reservoir 70 through the primary or secondary venting means, thus minimizing damage to the surrounding environment, particularly if the coffeemaker 26 is suspended beneath a kitchen cabinet 20, as in FIGS. 1 and 2. The primary venting means includes the vent ports 284 in the carafe-cover groove 276, the sealed space 288 between the shower plate 102 and the carafe cover 246, the discharge/ports 142 in the shower plate 102, and the primary venting passage 164 to the primary vent port 144 and nipple 148 overlying the reservoir 70. Should both the discharge/vent ports 142 and the vent ports 284 in the carafe-cover groove 276 be blocked, for instance, if both the shower plate 102 and the carafe-cover groove 276 are flooded, as during a brewing cycle, the secondary venting means is available and operable for venting purposes. The secondary venting means includes the secondary vent ports 286 in the center island 280 of the carafe cover 246, the sealed space 288, the single secondary vent port 152, and the separate secondary venting passage 166 to the secondary vent port 146 and nipple 150 which also overlie the reservoir 70. Further, any condensation of brewed coffee in the carafe 42, as on the outer surface of the coffee basket 234, merely drains back into the carafe 42 so as to maintain the desired brewed strength. After completion of the brewing cycle, the brewed coffee will be maintained at a suitable temperature by the warming plate 94.

The means for adjustably mounting the coffeemaker cabinet 28 beneath a kitchen cabinet 20 is quite unique and is characterized by a pair of the brackets 209 which depend from the kitchen cabinet 20 into slot-like openings 292 provided in the top wall 30 of the coffeemaker cabinet 28. As best illustrated in FIGS. 1, 2, 4 and 5, each bracket 290 has an inverted L-shaped configuration with a horizontal leg 294 thereof adapted to be secured flush against the underside of the bottom shelf 22 of the kitchen cabinet 20 by a pair of bolts 296 which extend downwardly through a mounting bar 298 supported on the upper surface of the cabinet's bottom shelf 22, through the bottom shelf 22, and through the horizontal leg 294 of the bracket 290, nuts 300 for the bolts 296 being disposed in nut-traps 302 provided in the horizontal leg 294. Suitable templates may be provided for locating the bolt holes in the bottom shelf 22.

A vertical leg 304 of each bracket 290 is in the form of a generally flat plate having horizontally aligned saw-tooth configurations or recesses 306 on both the front and rear edges thereof. A bracket or recess-engaging means 308 is provided for each bracket 290 inwardly of the side walls 32, 34 of the cabinet 28. Each bracket-engaging means 308 includes a slide member 320 which is mounted for forward and rearward sliding movement alongside and between the vertical leg 304 of the bracket 290 and the adjacent cabinet side wall 32, 34. Mounted on the forward end of each slide member 310 is a first rearwardly facing bracket-recess-engaging dog 312 which is suitably and laterally offset for latching engagement with any one of the vertically spaced saw-tooth recesses 306. A suitable guide structure 314 is provided on the cabinet 28 for each dog 312.

The rear end of each slide member 310 projects rearwardly through openings 316 provided in the back wall 38 of the coffeemaker cabinet 28 and a finger-engagable button 318 is provided thereon.

A second forwardly facing bracket-recess-engaging dog 320 is slidably supported in a guide structure 322 mounted on the cabinet 28 for latching engagement in any one of the vertically spaced saw-tooth recesses 306. Each dog 320 is operatively connected to its associated slide member 310 by a pivotally mounted linkage member 324 whereby, when the slide member 310 moves rearwardly, the dogs 312 and 320 automatically and simultaneously move into latching engagement with horizontally aligned saw-tooth recesses 306, the first dog 312 moving rearwardly and the second dog 320 moving forwardly into latching engagement. Conversely, forward movement of each slide member 10 through manual actuation thereof automatically and simultaneously moves the dogs 312 and 320 out of latching engagement with the saw-tooth recesses 306, the first dog 312 moving forwardly and the second dog 320 moving rearwardly, whereby to permit either vertical adjustment of the coffeemaker cabinet 22 relative to the brackets 290 or removal of the coffeemaker cabinet 22 from the brackets 290.

Each bracket-engaging means 308 has a two-armed spring member 326 for biasing each slide member 310 rearwardly and, therefore, biasing the dogs 312 and 320 into latching engagement with their respective brackets 290. One arm 328 of each spring member 326 engages a stop member 330 while the other arm 332 is connected to its respective slide member 310.

When the coffeemaker 26 is to be used as a countertop unit rather as an under-the-cabinet type unit. removable snap-in plugs 334 (FIG. 2) are provided for filling in the two top wall bracket openings 292 whereby to enhance the visual appearance of the coffeemaker 26.

While there has been showed and described a preferred embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. A coffeemaker comprising a housing having a carafe-receiving cavity in the front thereof, a water reservoir, a carafe having a coffee basket supported therein, a cover for said carafe having a spreader configuration in its upper surface, said carafe and cover being insertable in said cavity, means for heating said reservoir water and directing said heated water from the upper portion of said carafe-receiving cavity to said spreader configuration of said carafe cover, and sealing means mounted in said cavity for automatically sealing the upper portion of said cavity to the upper surface of said carafe cover when said carafe is inserted into said cavity.

2. A coffeemaker as recited in claim 1 wherein said sealing means provides means for venting the interior of said carafe to said reservoir.

3. A coffeemaker as recited in claim 1 wherein means are provided for adjustably mounting said housing beneath a kitchen cabinet.

4. A coffeemaker as recited in claim 1 wherein a slidable drawer is disposed above said reservoir and has discharge means at its inner end to facilitate filling said reservoir.

5. A coffeemaker comprising a cabinet having top, bottom, side and back walls, a portion of the front of said cabinet being open providing access to a carafe-receiving cavity, a carafe removably received in said cavity, a coffee basket associated with said carafe to comingle water and coffee grounds and deliver brewed coffee to said carafe, a reservoir, conduit means from said reservoir to a location in said cabinet above said carafe to deliver water from said reservoir to said coffee basket, heater means associated with said conduit means, and means for mounting said cabinet beneath a kitchen cabinet characterized by a pair of brackets secured to the kitchen cabinet and depending therefrom, each bracket being a flat plate member, spaced slot openings provided in said top wall parallel and adjacent to said side walls of said cabinet to receive said depending brackets, bracket engaging means disposed within said said cabinet having latch means for engagement with said brackets to lock said cabinet against vertical movement with respect to said brackets, said brackets being insertable into said openings for engagement with said latch means to support said coffeemaker cabinet from said kitchen cabinet.

6. A coffeemaker as recited in claim 5 wherein said bracket-engaging means are releasably engageable with said brackets at a plurality of vertical positions thereon whereby said coffeemaker cabinet is selectively mountable in any one of several vertically spaced positions beneath said kitchen cabinet, and manually actuatable means projecting outwardly of said coffeemaker cabinet to release said bracket-engaging means.

7. A coffeemaker comprising a cabinet having top, bottom, side and back walls, a portion of the front of said cabinet being open providing access to a carafe-receiving cavity, a carafe removably received in said cavity, a coffee basket associated with said carafe to comingle water and coffee grounds and deliver brewed coffee to said carafe, a reservoir, conduit means from said reservoir to a location in said cabinet above said carafe to deliver water from said reservoir to said coffee basket, heater means associated with said conduit means, means for mounting said cabinet beneath a kitchen cabinet characterized by a pair of brackets secured to the kitchen cabinet and depending therefrom through openings provided in said top wall of said coffeemaker cabinet for engagement by bracket-engaging means disposed within said coffeemaker cabinet, said bracket engaging means being releasably engageable with said brackets at a plurality of vertical positions thereon whereby said coffeemaker cabinet is selectively mountable in any one of several vertically spaced positions beneath said kitchen cabinet, manually actuable means projecting outwardly of said coffeemaker cabinet to release said bracket-engaging means, each bracket being a flat plate nember extending parallel to said side walls and having front and rear edges extending vertically, each bracket being provided on its front and rear edges with a series of horizontally aligned saw-tooth recesses, wherein each of said bracket-engaging means including a slide member which is slidable forwardly and rearwardly alongside one of said brackets and which has a recess-engaging first dog at its forward end for selective engagement with said recesses on the front edge of its associated bracket and a finger-engageable button on its rear end which projects through an opening provided in said back wall of said cabinet to facilitate actuation thereof, said bracket-engaging means including a forwardly and rearwardly slidable recess-engaging second dog which is operatively connected to said slide member by a linkage member in a manner such that when said slide member moves rearwardly to latchingly engage said first dog in one of the recesses on the front edge of its associated bracket said second dog is slid forwardly into latching engagement with a horizontally aligned recess on the rear edge of said bracket, and spring means biasing each of said slide members rearwardly and biasing their first and second dogs into latching engagement with their respective brackets, manual actuation of said pair of slide members serving to disengage each set of dogs from their associated brackets to permit either vertical adjustment of said coffeemaker cabinet relative to the kitchen cabinet or removal of said coffeemaker cabinet from said brackets.

8. A coffeemaker comprising a cabinet having top, bottom, side and back walls, a portion of the front of said cabinet being open providing access to a carafe-receiving cavity, a carafe removably received in said cavity, a coffee basket associated with said carafe to comingle water and coffee grounds and deliver brewed coffee to said carafe, a reservoir, conduit means from said reservoir to a location in said cabinet above said carafe to deliver water from said reservoir to said coffee basket, heater means associated with said conduit means, means for mounting said cabinet beneath a kitchen cabinet characterized by a pair of brackets secured to the kitchen cabinet and depending therefrom through openings provided in said top wall of said cabinet for engagement by bracket-engaging means disposed within said coffeemaker cabinet, said bracket engaging means being releasably engageable with said brackets at a plurality of vertical positions thereon whereby said coffeemaker cabinet is selectively mountable in any one of several vertically spaced positions beneath said kitchen cabinet, manually actuable means projecting outwardly of said coffeemaker cabinet to release said bracket-engaging means, a ported shower plate provided in the top of said cavity in communication with said reservoir through said conduit means, said coffee basket being disposed in said carafe, a cover for said carafe having depressed discharge openings in a spreader configuration in its upper surface to distribute water delivered to said basket by said shower plate, means for automatically sealing said ported shower plate against the upper surface of said carafe cover when said carafe is inserted into said cabinet cavity, said carafe having a pouring spout and said carafe cover having a depending skirt portion with an opening formed therein, said carafe cover being rotatable between a first "pour" position in which the skirt opening is aligned with the pouring spout and a second "brew/seal" position in which the pouring spout is sealed off by the carafe cover skirt.

9. A coffeemaker as recited in claim 8 wherein said means for automatically sealing said shower plate against the upper surface of said carafe cover comprises a resilient mounting for said shower plate in the top of said cavity with means provided between said shower plate and said top wall of said cabinet for biasing said shower plate in a downward direction.

10. A coffeemaker as recited in claim 9 wherein said means for biasing said shower plate comprises a three-legged leaf spring.

11. A coffeemaker as recited in claim 8 wherein venting means are provided between the interior of said carafe and said reservoir.

12. A coffeemaker as recited in claim 11 wherein said venting means is characterized by passage means provided in said ported shower plate.

13. A coffeemaker as recited in claim 12 wherein said venting means comprises both primary and secondary venting means and wherein separate passage means to said reservoir are provided in said ported shower plate for said primary and secondary venting means.

14. A coffeemaker comprising a cabinet having top, bottom, side and back walls, a portion of the front of said cabinet being open and defining an access opening to a carafe-receiving cavity, a reservoir mounted in said cabinet alongside said cavity, a shower plate floatingly mounted in the top of said cavity, resilient means provided between said shower plate and said top wall of said cabinet, means in said cabinet for filling said reservoir, conduit means between said reservoir and said shower plate, heater means associated with a portion of said conduit means to provide hot water to said shower plate, a carafe having a pouring spout and a coffee basket supported therein, a cover for said carafe with the upper surface thereof being sealingly engageable with the underside of said floating shower plate, ports formed in both said shower plate and said carafe cover for directing said hot water from said shower plate to said coffee basket, and means extending through said cover and shower plate for venting the interior of said carafe to said reservoir.

15. The combination of claim 14 wherein said cover is formed with central depressed area having openings through which water passes into said coffee basket, said shower plate engaging and sealing against said cover along an annular surface surrounding said depressed.

16. A coffeemaker as recited in claim 14 having means for adjustably mounting said cabinet beneath a kitchen cabinet.

17. A coffeemaker as recited in claim 16 wherein said mounting means comprises a pair of brackets secured to and depending from said kitchen cabinet, said brackets extending into said coffeemaker cabinet through openings formed in the top wall thereof, and bracket engagement means in said cabinet releasably engageable with said brackets for supporting said cabinet from said brackets, said bracket engagement means having manually engageable portions projecting from said cabinet to permit actuation of said bracket engagement means and disengagement from said brackets.

18. A coffeemaker as recited in claim 17 having plug members adapted to be inserted into said top wall openings when said cabinet is not supported on said brackets.

19. A coffeemaker as recited in claim 14 wherein said carafe cover is rotatable between a first position wherein said pouring spout is blocked and a second position wherein said pouring spout is open.

20. A coffeemaker as recited in claim 14 wherein said venting means is provided in part in said shower plate.

21. A coffeemaker as recited in claim 20 wherein said venting means comprises a primary venting arrangement and a secondary venting arrangement.

22. A coffeemaker as recited in claim 14 wherein said carafe cover is provided with an annular groove in its upper surface with said ports being disposed in the bottom of said groove and with the sealing engagement of said cover upper surface with said floating shower plate being outwardly of said groove; said venting means including a primary venting arrangement comprising said carafe cover and said shower plate ports and first passage means to said reservoir; said venting means including secondary venting arrangement comprising vent ports in said carafe cover upper surface inwardly of said groove, a separate vent port formed in said shower plate, and second passage means between said separate vent port and said reservoir, said secondary venting arrangement being operable even if said shower plate and carafe cover groove are both flooded, thus blocking off both said shower plate ports and said carafe cover groove ports of said primary venting arrangement, as during a brewing cycle.

23. A coffeemaker as recited in claim 22 wherein both said first and second vent passage means are provided in said shower head plate.

24. A coffeemaker as recited in claim 14 wherein said resilient means comprises a three-legged leaf spring secured at its center to the upper surface of said shower plate.

25. A coffeemaker as recited in claim 14 wherein said means for filling said reservoir comprises an open-topped drawer slidable in and out of said cabinet above said reservoir and having a bottom surface which is inclined downwardly to a discharge opening at the rear of the drawer, which discharge opening is disposed above said reservoir in all positions of said drawer.

26. A coffeemaker comprising a cabinet having top, bottom, side and back walls, a portion of the front of said cabinet being open and defining an access opening to a carafe-receiving cavity, a carafe for said cavity having a handle and a pouring spout, a coffee basket, a reservoir mounted in said cabinet, a slidable drawer above said reservoir having discharge means at its inner end for filling said reservoir, a ported shower plate disposed in the top of said cavity, a thermal pumping arrangement between said reservoir and said ported shower plate, a pair of brackets secured to and depending from the underside of a kitchen cabinet through a pair of openings formed in said top wall of said coffeemaker cabinet and each bracket having a series of vertically spaced, horizontally aligned recesses formed on the front and rear edges thereof, a pair of sliding dogs for each bracket disposed within said cabinet with each pair of dogs being simultaneously engageable in aligned front and rear recesses provided on said brackets for adjustably supporting said coffeemaker cabinet beneath said kitchen cabinet, and means for manually releasing each set of dogs from engagement with their associated bracket to permit removal or vertical adjustment of said coffeemaker cabinet from or relative to said brackets.

27. A coffeemaker as recited in claim 26 wherein said dog release means comprises a pair of forwardly and rearwardly movable slide members operably connected with each pair of dogs, said slide members being disposed inwardly of said cabinet side walls and projecting outwardly of said cabinet through openings provided in said back wall.

28. A coffeemaker as recited in claim 26 wherein said coffee basket is supported in said carafe, wherein a cover is provided for said carafe, which cover is rotatable between "pour" and "brew/seal" positions, said pouring spout being blocked off by a portion of said cover in said "brew/seal" position, wherein the top surface of said carafe cover is provided with a ported spreader configuration, wherein said ported shower plate is floatingly mounted in the top of said cavity, and wherein spring means are provided for biasing said shower plate into sealing engagement with the top surface of said carafe.

29. A coffeemaker as recited in claim 28 wherein venting means are provided between the interior of said carafe and said reservoir, said venting means being characterized in part by passage means provided in said shower plate.

30. A coffeemaker comprising a cabinet having top, bottom, side and back walls, a portion of the front of said cabinet being open and defining a carafe-receiving cavity, a keep-warm plate in the bottom of said cavity, a reservoir mounted in said cabinet alongside said cavity, a shower plate floatingly mounted in the top of said cavity, leaf spring means provided between said shower plate and said top wall of said cabinet, a drawer in said cabinet for filling said reservoir, conduit means between said reservoir and said shower plate, heater means associated with said keep-warm plate and a portion of sard conduit means whereby to pump heated water from said reservoir to said shower plate, a carafe having a pouring spout at its upper end and a coffee basket removably supported therein, a cover rotatably mounted in the top of said carafe with the upper surface thereof being sealingly engageable with the underside of said floating shower plate, ports formed in both said shower plate and said carafe cover for directing said heated water from said shower head plate to said coffee basket, and means for venting said carafe to said reservoir.

31. A coffeemaker as recited in claim 30 having means for adjustably mounting said cabinet beneath a kitchen cabinet.

32. A coffeemaker as recited in claim 31 wherein said mounting means comprises a pair of brackets secured to and depending from said kitchen cabinet, said brackets extending into said coffeemaker cabinet through openings formed in the top wall thereof, slidable dogs in said cabinet releasably engageable in recesses provided in said brackets for supporting said cabinet from said brackets, and manually engageable means projecting from said cabinet for releasing said dogs from said bracket recesses.

33. A coffeemaker as recited in claim 30 wherein said venting means comprises a primary venting arrangement and a secondary venting arrangement, both of which are characterized in part by separate passage means provided in said shower plate.

34. A coffeemaker as recited in claim 30 wherein said drawer for filling said reservoir comprises an open-topped drawer slidable in and out of said cabinet above said reservoir and having an arcuately curved bottom surface which is also inclined downwardly to a discharge opening at the rear of the drawer, which discharge opening is disposed above said reservoir in all positions of said drawer.

35. A coffee carafe for use with a drip coffeemaker having a shower plate connected to a reservoir through a thermal pumping arrangement, the carafe adapted to be removably positioned beneath said shower plate during a coffee brewing operation, said coffee carafe comprising an open-top glass vessel, a plastic sleeve-like collar member fitted over and mounted on the upper edge of said glass vessel and having an inwardly directed shoulder intermediate its upper and lower edges, a handle mounted on said collar member, said collar member having a pouring spout and a control slot formed in its upper edge, a coffee basket removably supportable on said inwardly directed shoulder of said collar member, a carafe cover adapted to be supported on said collar member and having a depending skirt portion which is telescopically receivable in said collar member and which normally serves to close off said pouring spout, said skirt portion having an opening formed therein which is rotatable into alignment with said pouring spout whereby to permit the pouring of coffee from said carafe, a radially extending handle on said cover which is receivable in said control slot and which is adapted for rotating said cover relative to said collar member between a first limit position in which said pouring spout is closed and a second limit position in which said skirt opening is aligned with said pouring spout to permit pouring coffee, the upper surface of said cover having, a series of ports in a spreader configuration for directing water from said shower plate onto coffee grounds in said coffee basket.

36. A coffee carafe as recited in claim 35 wherein an annular groove is formed in the top surface of said cover with a center island being defined thereby, and wherein said ports are provided in the bottom of said groove.

37. A coffee carafe as recited in claim 36 wherein the upper surface of said center island is spaced below the portion of the upper surface of said cover disposed outwardly of said groove, wherein said ports in the bottom of said groove also serve as primary vent ports, and wherein a series of secondary vent ports are provided in said upper surface of said center island.

38. A coffee carafe as recited in claim 35 wherein an annular plastic sleeve is provided between said glass vessel and said collar member, said sleeve having an upper portion with an inverted U-shaped cross-sectional configuration fitted over the upper edge of said glass vessel.

* * * * *